Figure 1:
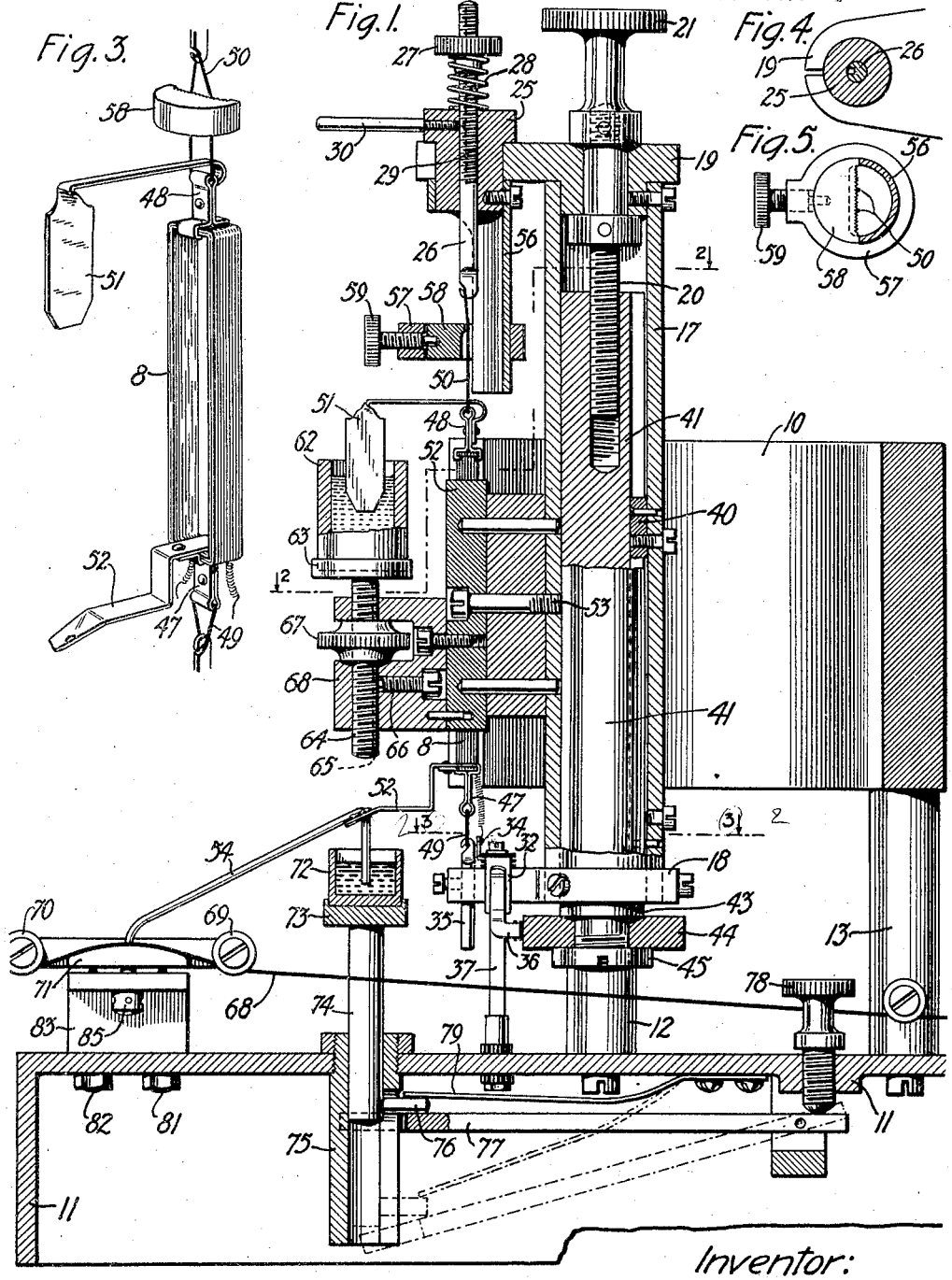

Nov. 30, 1926.  
A. A. CLOKEY  
1,609,060  
RECORDING INSTRUMENT  
Filed Jan. 19, 1924   3 Sheets-Sheet 1

Inventor:  
Allison A. Clokey

Nov. 30, 1926.

A. A. CLOKEY 1,609,060

RECORDING INSTRUMENT

Filed Jan. 19, 1924     3 Sheets-Sheet 2

Inventor:
Allison A. Clokey

Nov. 30, 1926.  
A. A. CLOKEY  
RECORDING INSTRUMENT  
Filed Jan. 19, 1924  
1,609,060  
3 Sheets-Sheet 3
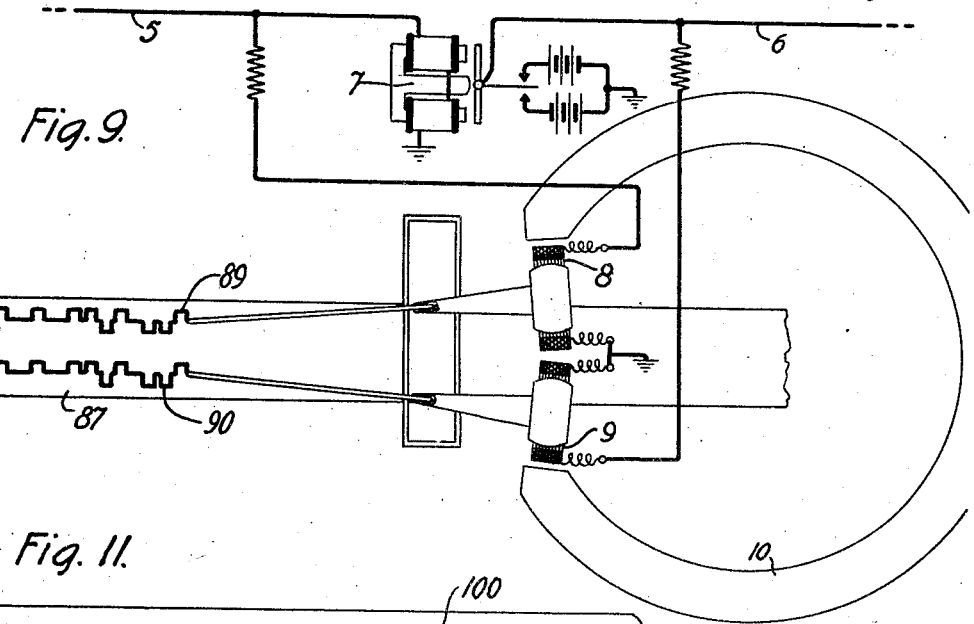
Fig. 9.
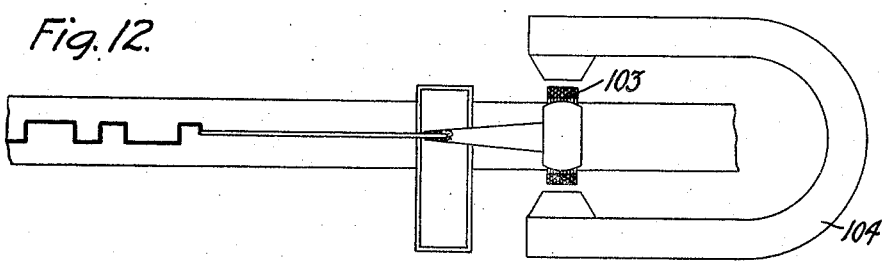
Fig. 11.
Fig. 12.
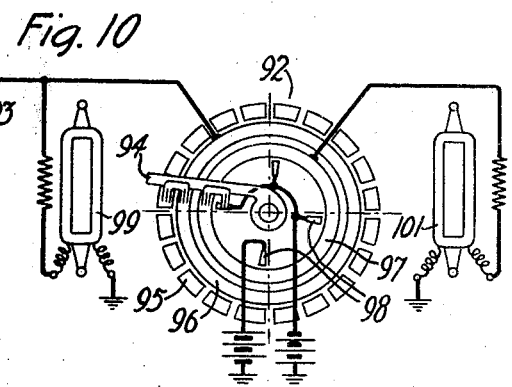
Fig. 10
Inventor:
Allison A. Clokey Patented Nov. 30, 1926.

1,609,060

UNITED STATES PATENT OFFICE.

ALLISON A. CLOKEY, OF RUTHERFORD, NEW JERSEY.

RECORDING INSTRUMENT.

Application filed January 19, 1924. Serial No. 687,272.

This invention relates to recording instruments, and more particularly to siphon recorders or direct writing recorders for use in connection with telegraph and submarine telegraph systems.

In the operation of telegraph systems consisting of two or more line sections connected together through automatic repeating apparatus, it is customary practice, particularly in the case of submarine telegraph cables, to take continuous records of the signals received over one line section and those transmitted by the operation of repeating apparatus into the adjoining line section. This is done to provide a means whereby the quality of the received and transmitted signals may be continuously observed, thereby permitting the immediate detection of any distortion of the signals due to faulty adjustment of the repeating apparatus. For this purpose, two recorders of the moving coil type, commonly known as direct writers, are employed. When it is desired to make such a record, the recorders are arranged so that the paper or tape on which the recorders are to be made passes first through one of the recorders, where it receives on its upper half the record of the incoming signals from one line section. Then it passes through the second recorder, which makes a record of the outgoing signals on the lower half of the tape. It is customary in actual practice to place the recorders so that they are spaced from eighteen to thirty-six inches apart so that the records made of corresponding signals, which must be compared by a repeater attendant for accuracy of reproduction, are separated a distance equal to the distance which the recorders are spaced apart. This necessitates the reading of both records continuously. It is therefore the object of this invention to overcome the difficulties met with in the methods heretofore employed.

Another object is to make a readable record of signals transmitted in the uniform codes, of which the well known Baudot or five unit code is an example.

A further object is to facilitate the adjustment of the writing elements of the recorders independently with respect to the paper or tape without altering the effectiveness of the damping devices.

Other objects will be in part obvious and in part pointed out in the description which is to follow.

In accordance with the above objects, the present invention contemplates the provision of a moving coil type of siphon recorder or direct writer having two recording mechanisms arranged so that a record made by one of the mechanisms of the received signals will be directly above, that is, in the same transverse plane as the record made of the outgoing signals corresponding to the received signals by the other mechanism. With the two records one directly above the other, the repeater attendant can detect by quick comparison any differences in shape, amplitude and character between the two records without actually reading both records. The invention further provides for the adjustment of the writing element of one recorder without altering the position or location of the writing element associated with the other recorder.

Figure 2:
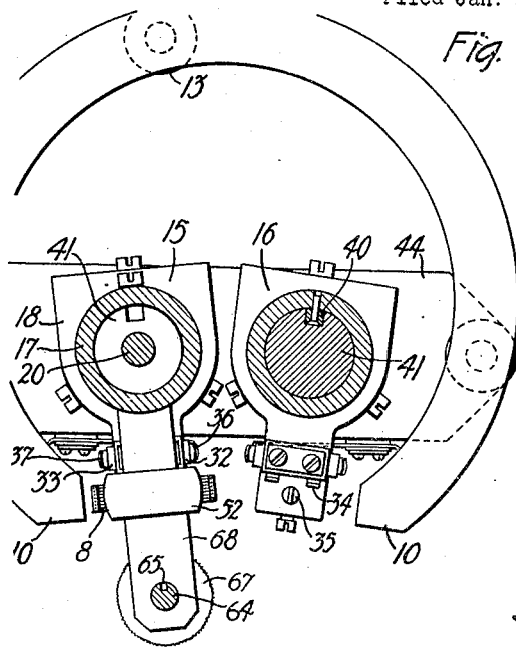
Figure 8:
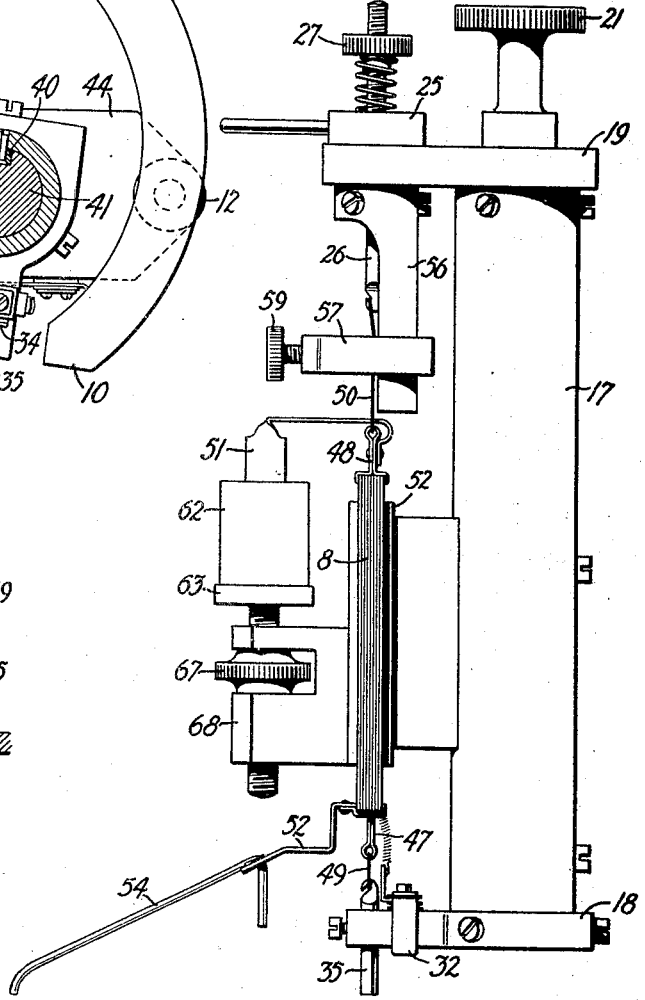
Figure 6:
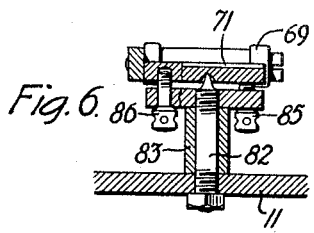
Figure 7:
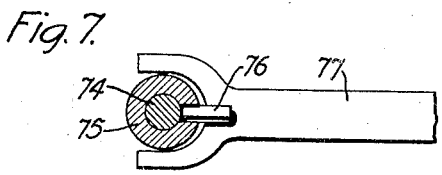

A better understanding of the invention may be had from the following description when taken in conjunction with the accompanying drawings, in which Fig. 1 is a side elevation partly in section of one embodiment of the invention; Fig. 2 is a sectional view taken along the broken lines 2—2 and 3—3 of Fig. 1; Fig. 3 shows the moving coil; Fig. 4 shows the method of supporting the upper suspension member; Fig. 5 is a detail of the suspension tensioning means; Fig. 6 is a sectional view of the writing table; Fig. 7 is a detail view of a part of the mechanism for changing the height of the ink vessel; Fig. 8 is a plan view of the center piece with its associated elements removed; Fig. 9 shows the adaptation of the double recorder to a telegraph system and the type of signals as well as their relation to each other recorded by the recorders; Fig. 10 shows the recorders applied to a multiplex telegraph system in which the Baudot or five unit code is employed; Fig. 11 shows a portion of the tape with the type of signals recorded by the arrangement shown in Fig. 9; and Fig. 12 shows a recorder having a single moving coil.

Referring now for the moment to Fig. 9, in which one embodiment of the invention is illustrated, two line sections 5 and 6, having associated with their ends a relay 7, are shown. Relay 7 responds to incoming signal current impulses from line section 5 and repeats regenerated signal current impulses which correspond to those received from line section 5 into line section 6. Operatively connected to each of these line sections is a signal current responsive element of the recorder, which forms one embodiment of the invention. Each of these current responsive elements 8 and 9 is carried by a center piece and lies in a magnetic field produced by a permanent magnet 10, which is supported on a base 11 by uprights 12 and 13 (Fig. 1).

As shown in Fig. 1, the uprights 12 and 13 are secured to the base 11 by means of suitable screws and carry the permanent magnet 10 such that the current responsive elements 8 and 9, which, for the sake of clearness will be designated hereinafter as coils, lie in the magnetic field produced by the magnet 10. It is to be noted, however, that the effectiveness of coils 8 and 9 is not sacrificed by the larger air gap in the permanent magnet 10 necessary to accommodate both of the coils 8 and 9 and thus have them in the same magnetic field, thereby making it possible to combine the functions, as will be explained more in detail further on, of two recorders in a unitary structure. This is made possible by the special method of construction and the material used in forming the coils, as will be described later.

Each of the coils 8 and 9 is carried by center pieces 15 and 16, respectively, as shown more clearly in Figs. 1 and 8. The center piece 15, which carries coil 8, as well as center piece 16, which carries coil 9, comprises a tubular member 17, having at its upper and lower ends projecting portions 18 and 19, which are fastened to the tubular member 17 by means of screws or other suitable fastening means. Passing through a substantially central aperture in the portion 19 is a screw 20, having one end extending within the tubular member 17 with its outer end fastened to a knurled thumb nut 21. Also carried by projecting portion 19 (Figs. 1 and 4) and held in any desired angular position due to the frictional pressure thereon, resulting from its engagement with the walls of another aperture therein, is a block 25, through which a suspension member 26 extends. This suspension member 26 is threaded to receive a nut 27, having interposed between it and the block 25 a helical spring 28, which exerts a force sufficient to make the suspension member 26, which has a keyway 29 (Fig. 1) engaged by the squared end of a partly threaded rod 30, follow the nut 27. When the nut 27 is screwed either right or left, the suspension member 27 is moved either up or down but is prevented from rotary motion due to the engagement of the end of rod 30 with the key-way 29. Angular adjustment of the suspension member 26 and of the coil 8 may, however, be produced by moving rod 30, whereupon the block 25, together with the member 26 and coil 8, is rotated.

The projecting portion 18, which is secured to the bottom of the tubular member 17, has insulatingly fastened thereto contact members 32 and 33 (Fig. 2). Each of these members has secured thereto angle members 34 to which the leading out wires of the moving coils 8 and 9 are fastened. Also adjustably mounted in the portion 18 is a lower suspension member 35. The contacts 32 and 33 are adapted to be engaged by the free ends of contact springs, such as 36 and 37, which are insulatingly fastened, respectively, in the base 11 (Fig. 1) and the center piece support 44, and connected to suitable binding posts (not shown). This contact mechanism permits of the ready and quick removal of the center piece with its associated coil without disturbing any permanent connections, by merely rotating the knurled nut 21 in a counter-clockwise direction.

As shown in Fig. 1, a key 40 is fastened to the inner wall of the tubular member 17 and is adapted to fit in a key-way formed in a post 41. The lower end of the post 41 has a shoulder or collar 43 which rests on a bridge 44 extending between the uprights 12, 12 and on which the center piece rests, the post 41 being held rigidly in position by a nut 45. In the upper end of the post 41 is a threaded aperture for receiving the screw 20. When the knurled thumb nut 21 is rotated, the vertical movement of the tubular member 17 with its associated parts results, while it is prevented from rotating due to the engagement of key 40 carried thereby with the key-way in the post 41.

In the construction of one embodiment of the invention, as previously pointed out, two moving coils are placed in a magnetic field produced by a single magnet. This obviously introduces into the magnetic circuit a considerably longer air gap than would be required if only one such coil were to be employed and the effect of this increased length of the air gap is to reduce the flux through the coils which results in the current sensitivity of each of the coils being appreciably reduced. In order to avoid this loss of current sensitivity due to the increased length of air gap, a coil of novel construction is employed which contains a greater number of turns or wire than was possible to obtain in the coils heretofore employed, without any increase in the weight or resistance thereof. In the present embodiment, the coil is not formed of copper wire but is composed of enamelled aluminum wire, which is wound on a form, impregnated in a natural or synthetic resin varnish, preferably bakelite, and baked until thoroughly hard, when the form is removed, leaving only the wire coil supported by the hardened resinous binder. Such a coil has the required rigidity and a sufficiently large number of turns without an increase in either weight or resistance to completely offset the loss of flux due to the greater length of air gap.

To the upper and lower portions of the coil (Fig. 3) supporting clamps 47 and 48, respectively, are clamped and serve as means for attaching the fiber supporting elements 49 and 50, which may be slipped in notches in the suspension members 26 and 35. To the clamp 47 there is secured a damping vane 51, while a siphon arm 52 is formed integrally with the clamp 47. This siphon arm, as shown in Figs. 1, 3 and 8, is bent at an angle of substantially 90°, thus permitting the longitudinal adjustment of an associated siphon 54 by merely bending the vertical portion of the siphon arm 52. One end of the siphon 54 is bent at an angle of substantially 90° and passes through an aperture in the free end of the siphon arm. The free end of the siphon arm is also crimped slightly, thereby serving as a fastening means for the siphon, which may also be further secured by a small deposit of sealing compound at the point of entrance of the siphon.

With the upper and lower fibers 48 and 50 in notches in the suspension members 26 and 35, the proper tension may be obtained by turning the nut 27 to either the right or left the required number of times. However, if it is desired to alter the angular position of the coils, this may be accomplished by moving the handle 30, thereby rotating block 25 through the medium of which the associated coil will be rotated.

It is also often desirable to change the period of the coils by a greater amount than can conveniently be obtained by straining the fiber suspension members 49 and 50. In the construction shown in Figs. 1 and 5, this is made possible by the use of a portion of a tubular member 56, which is fastened to the block 25 and which is encircled by a collar 57. Carried by the collar 57 and having saw teeth on a surface thereof is a semi-circular block 58, which is engaged by an end of a clamping screw 59 threaded in the collar 57 and serving as a locking means for the collar. When it is desired to change the period of the coil, the block 58 is moved either up or down, depending upon whether it is desired to increase or decrease the period of the coil, when the screw 59 can again be tightened and the block 58 will be securely held in its new position. The period of the coil may also be changed by altering the spread of the fiber supporting elements by putting them in different ones of the saw teeth in the block 58. These two adjustments permit of accurately adjusting the periodicity of the coils to any desired value which may be required in practice. Each of the coils 8 and 9 is adapted to turn freely around an iron core 52, which is secured to the tubular portion 17 by screws 53, and which reduces the air gap between the poles of the permanent magnet 10 to a minimum.

The damping vane 51 is adapted to dip in a viscous oil contained in a receptacle 62, which rests in a depressed portion of an adjustable platform 63. The adjustable platform 63 is carried on one end of a screw 64, having a key-way 65 engaged by the unthreaded end of a screw 66 and having a knurled nut 67 which fits in a slot cut in block 68. The oil receptacle 62 is thus supported by the block 68, which is fastened to the tubular member 17 and is removable therewith. With the type of construction just described, the height of the oil receptacle with respect to the damping vane 51 may be adjusted by merely turning nut 67, which causes the vertical movement of the screw 64 without causing its rotation. As in the previous case, the rotary movement is prevented owing to the engagement of the unthreaded end of screws 66 engaging the key-way 65 in the screw 64.

The siphon associated with each of the moving coils has one end resting on the tape 68, which passes underneath tape tensioning rolls 69 and 70 and over a tape table 71, while the other end dips in an inkwell 72. The inkwell 72, as shown in Fig. 9, is wide enough to accommodate the siphons for both of the moving coils, and as is shown in Fig. 1, is carried by platform 73, which is secured to a rod 74. This rod 74 extends into a tubular member 75 secured in the base 11 and having a slot therein to permit the free vertical movement of a pin 76, which is integral with the rod 74. Adapted to engage this pin is a bifurcated end of a member 77, which is pivoted near its other end in a suitable bracket secured to the base 11 and which is engaged by a screw 78. When it is desired to move the inkwell 72, the screw 78 is turned down, and by providing the member 77 with a short and a long arm, the rod 74 may be raised a relatively large amount by only a very slight turn of screw 78. In order to have the rod 74 follow the downward movement of member 77, a flat spring 79 having one end fastened to the under side of the base 11 and its free end resting on the pin 76 is provided. Thus, the spring 79 tends to hold the pin 76 at all times against member 77.

In accordance with the construction of one embodiment of the invention, the tape table (Figs. 1 and 6) is arranged so that it may be tilted to any desired position such that the table is in a plane parallel to the plane in which the siphons move. This construction will now be described. The table 71 has attached thereto two tape rolls 69 and 70 and rests on knife-edges formed on the upper ends of two bolts 81 and 82. Each of these bolts passes through a block 83 and serves to hold a projecting member 84 firmly in place. Extending through the member 84 and engaging the under surface of the table 71 are a pair of capstan headed screws 85 and 86, which are diametrically opposite each other and in a plane at right angles to the bolts 81 and 82. Now, by loosening one of the capstan headed screws and tightening the other, the table 71 may be tilted to any desired degree. In this way the tape table 71 may be accurately adjusted with respect to the siphons, thereby preventing distortion of the recorded signals due to non-uniform pressure of the siphons upon the tape.

Should it at any time be desired to change the vertical position of the siphon associated with center piece 15, this may be done without disturbing the position of the other siphon by merely operating knurled nut 21. Consequently, the center piece 15 together with the damping receptacle 62, the moving coil 8 and the siphon 54 will be moved either up or down, depending on the direction which the thumb nut 21 is turned. It is thus possible to adjust vertically each suspension structure, commonly known as the center piece, with respect to the tape so that each siphon upon that tape may be adjusted independently and separately of the other siphon. Also, the position of the damping fluid may be adjusted independently of the adjustment of the coil suspension or center piece so that the adjustment of one does not affect the other.

The structure herein described has a variety of uses, only two of which have been shown, although many other adaptations may be made without departing from the spirit and scope of the present invention. For example, equally good results would be obtained if in place of a single permanent magnet, a permanent magnet for each of the coils was provided. It is therefore not intended that the invention be limited to the specific application described but only by the appended claims.

Referring again for the moment to Fig. 9, in which one adaptation of the invention is disclosed, it is, as has already been previously pointed out, customary in telegraph and submarine telegraph operation to make a record of the signals received and transmitted at a repeater station.

In this particular adaptation, moving coil 8 is connected to the incoming line section 5, while coil 9 is associated with the outgoing line section 6. Now, when the signals are impressed on line section 5, relay 7, which, as previously described, is connected intermediate the ends of line sections 5 and 6 and moving coil 8, will respond to such signal current impulses. Relay 7 will impress on line sections 6 regenerated signal current impulses in accordance with the received signal impulses, but moving coil 8 will cause the movement of the siphon associated therewith to produce on a tape 87 a record, such as 89, designating the character of the signal current impulses received. Likewise, coil 9 responds to the signal current impulses impressed on line section 6 by relay 7 and causes its siphon to produce on the same tape 87 a record 90, which is in the same plane and position as record 89. Thus, when a repeater attendant desires to check for distortion, it is only necessary for him to observe the character of the records 89 and 90, which, being in the same plane, he can readily detect any distortion between the received and transmitted signals by inspection without the necessity of actually reading both records continuously.

In the transmission and recording of signal current impulses in accordance with the Baudot or five unit code it is impossible to read such signals since the beginning and end of a particular group of impulses is not indicated, and furthermore, there is nothing to indicate the quadrant in which the impulses were transmitted. In the arrangement shown in Fig. 10, both the beginning and end of the group of impulses and the means whereby the quadrant may be determined are indicated on the record tape. In Fig. 10 a multiplex distributor 92 is shown connected to a line 93. The distributor 92 comprises a brush arm 94, which carries a pair of brushes for bridging a plurality of segments 95 with a continuous ring 96 and a continuous ring 97 with segments 98. It is, of course, to be understood that the distributor is arranged for quadruplex transmission and has associated with each set of five segments 95 suitable transmitting apparatus. Now, in order to record the signal current impulses transmitted, one coil of the recorder is connected to the line 93, while the other coil is connected to ring 97. Now, as the brush arm 94 revolves, the segments 95 will be successively bridged with ring 96 and signal current impulses will be transmitted in accordance with the operation of the transmitter associated with the particular group of segments. Consequently, the coil 99 responds to each current impulse transmitted and produces on the tape, a record such as 100 (Fig. 11), which represents the signal current impulses transmitted. In order that the signal current impulses transmitted for each quadrant of the distributor 92 may be checked for distortion, the segments 98 are spaced at the beginning of each quadrant. One of the segments has positive battery connected thereto while the others are connected to negative battery. Now each time the inner brush carried by brush arm 94 passes on to these segments 98, moving coil 101 responds and causes the movement of its siphon to produce a record on the tape, such as 102 (Fig. 11). It should be noted that the representative records 102 are both above and below the zero line, thus enabling a person to determine quickly and accurately the signal current impulses for each quadrant and check whether any of them are distorted.

In the modification shown in Fig. 12 a single moving coil 103 is shown in the magnetic field of a permanent magnet 104. The construction of this embodiment of the invention is similar in all other respects to the embodiment employing two coils, as previously described, and further description thereof is believed unnecessary. It is also noted that greater sensitivity is obtained in the type of construction shown in this figure due to the construction of the coil 103, which is the same as previously described.

Although the invention has been disclosed and described with reference to a particular adaptation, it is, of course, obvious that many modifications and changes may be made without departing from the spirit and scope of the present invention.

What is claimed is:

1. A telegraph recorder having in combination a means for producing a magnetic field, a continuously moving record receiving means, and a plurality of independent recording means cooperating with said magnetic field to produce a plurality of record traces on said record receiving means, one of said recording means being actuated by the incoming signals and another of said recording means being actuated by the retransmitted signals.

2. A telegraph recorder having in combination a means for producing a magnetic field, a continuously moving record receiving means, and a plurality of independent recording means, each cooperating independently with and separately adjustable in its relation with said magnetic field and said record receiving means, one of said recording means being actuated by the incoming signals and another of said recording means being actuated by the retransmitted signals.

3. A telegraph recorder having in combination a means for producing a magnetic field, a continuously moving record receiving means, a plurality of independent recording means cooperating with said magnetic field and said record receiving means, one of said recording means being actuated by the incoming signals and another of said recording means being actuated by the retransmitted signals, and independently adjustable damping means associated with each of said recording means.

4. A telegraph recorder having in combination a means for producing a magnetic field, a moving record receiving means, a plurality of independent recording devices cooperating with said magnetic field to produce a plurality of records on said record receiving means, one of said devices being actuated by the incoming signals and another of said devices being actuated by the retransmitted signals, each of said recording devices comprising an open coil of aluminum wire, whereby said coil has a lower moment of inertia than a copper coil of the same number of turns and the same resistance.

5. A telegraph recorder having in combination, means for producing a magnetic field, a continuously moving record receiving means, a plurality of independent recording means cooperating with said field to produce a plurality of record traces on said record receiving means, said recording means being independently removable from said magnetic field, and means for automatically disconnecting said recording means from its associated external circuit upon the removal of said recording means.

6. In combination, a plurality of current responsive elements, one of said elements being actuated by incoming signals and another of said elements being actuated by retransmitted signals, a tape, means associated with each of said elements for recording the signal current impulses on said tape, and means for effecting the adjustment of one of said means independent of said other means.

7. In combination, a plurality of current responsive elements, one of said elements being actuated by incoming signals and another of said elements being actuated by retransmitted signals, a tape, a device associated with each of said elements for producing on said tape two separate and distinct records of signal current impulses, and means for effecting the adjustment of one of said devices independent of said other device.

8. In combination, a plurality of supports, a current responsive element carried by each of said supports, a tape, a device associated with each of said elements for producing on said tape separate records of the incoming and retransmitted signal current impulses, respectively in accordance with the operation of said elements, and means for adjusting said supports independently of each other whereby the devices may be adjusted irrespective of the position of the other device.

9. A siphon recorder comprising a base, a moving coil, a center piece supporting said coil, means secured to the base serving as terminals for the ends of said coil, and means for allowing the removal of said center piece without disturbing permanent connections.

10. A siphon recorder comprising a center piece, a moving coil carried by said center piece and responsive to signal current impulses, a damping means for said coil also carried by said center piece, a tape, a siphon controlled by said coil for producing records of the signal current impulses on said tape, and means for adjusting said center piece vertically for altering the pressure of said siphon on said tape.

11. A recording instrument comprising a support, a current responsive coil carried by said support, contact terminals for the ends of said coil, and contact springs engaging said terminals when said support is positioned for permitting its removal without affecting the connections of said coil.

12. A recording instrument comprising a base, a support mounted on said base, a current responsive coil carried by said support, contact terminals for the ends of said coil, and contact springs projecting vertically from said base and engaging said contact terminals whereby said support and coil may be removed without affecting the connections of said coil.

13. In combination, a tape, a plurality of recording devices comprising current responsive elements, actuated respectively by current impulses in different branches of a signal circuit, and recording means for each of said current responsive elements for simultaneously recording on said tape records of the signal current impulses in said different branches of a signal circuit.

14. In combination, a permanent magnet, a plurality of current responsive devices arranged in the magnetic field of said permanent magnet, said devices being actuated respectively by current impulses in different branches of a signal system, recording elements individual to each of said current responsive devices for producing independent records, damping means for each of said coils, and means for permitting the adjustment of said damping means of one device independent of the corresponding means of the other device.

15. In combination, a tape, a permanent magnet, a plurality of current responsive devices arranged in the magnetic field of said permanent magnet, said devices being actuated respectively by current impulses in different branches of a signal system, and recording elements individual to each of said current responsive devices for producing independent records on said tape.

16. In combination, repeating apparatus, a recording instrument associated with said repeating apparatus comprising a pair of current responsive coils connected and supported by said repeating apparatus, a permanent magnet for supplying the magnetic field for said coils, and recording elements connected to each of said coils for producing on a tape records of the incoming signals received and the signals retransmitted by said repeating apparatus.

17. A recorder comprising a base, uprights secured to said base, a bridge between said uprights, a pair of posts secured to said bridge, a suspension member removably fastened to each of said posts, current responsive devices carried by each of said suspension members, a tape, a recording element connected to each of said devices for producing on said tape, records of signal current impulses, and means for adjusting said suspension members independently of each other to alter the pressure of said recording elements on said tape.

In witness whereof, I hereunto subscribe my name this 16 day of January A. D., 1924.

ALLISON A. CLOKEY.